United States Patent

[11] 3,619,276

| [72] | Inventors | Jiro Shimeha<br>Ikeda-shi;<br>Takeo Shima, Iwakuni-shi; Yukiharu Asami, Iwankuni-shi; Ryuichiro Tsuzuki, Ibaragi-shi; Norboru Yabuuchi, Ibaragi-shi, all of Japan |
|---|---|---|
| [21] | Appl. No. | 878,033 |
| [22] | Filed | Nov. 19, 1969 |
| [45] | Patented | Nov. 9, 1971 |
| [73] | Assignee | Teijin Limited<br>Osaka, Japan |
| [32] | Priority | Oct. 21, 1965 |
| [33] | | Japan |
| [31] | | 40/64655 |
| | | Continuation-in-part of application Ser. No. 587,313, Oct. 7, 1966, now abandoned. |

[54] PROCESS FOR IMPROVING SURFACE CHARACTERISTICS OF POLYESTER SHAPED ARTICLES
7 Claims, 1 Drawing Fig.

[52] U.S. Cl. .................................................... 117/138.8 F,
                                       117/139.5 A, 117/161 UT
[51] Int. Cl. .................................................... B23b 27/00
[50] Field of Search .................................................. 117/138.8
F, 139.5 A, 161 UT, 161 UC, 161 K, 167; 260/75
R, 860, 861, 875

[56] References Cited
UNITED STATES PATENTS

| 2,865,891 | 12/1958 | Michel ........................ | 260/75 |
| 3,136,655 | 6/1964 | Wolinski ..................... | 260/75 X |
| 3,252,941 | 5/1966 | Mayer et al. ................. | 260/861 |
| 3,310,512 | 3/1967 | Curtice........................ | 260/75 X |
| 3,340,327 | 9/1967 | Spellberg et al. ............. | 260/861 |
| 3,416,952 | 12/1968 | McIntyre et al. ............. | 117/138.8 X |

Primary Examiner—William D. Martin
Assistant Examiner—Theodore G. Davis
Attorney—Sherman and Shalloway

ABSTRACT: A process of improving the surface characteristics of polyester shaped articles which comprises coating said articles with a composition comprising a copolyester consisting of (A) a water-soluble polyoxyalkylene glycol having a molecular weight of 7000–15,000, (B) terephthalic acid and (C) ethylene glycol or a copolyester consisting mainly of the above wherein said water-soluble polyoxyalkylene glycol is present in a range of from about 40 to about 75 percent by weight and the reduced viscosity of the resultant copolyester is within the range of 0.9 to 2.0.

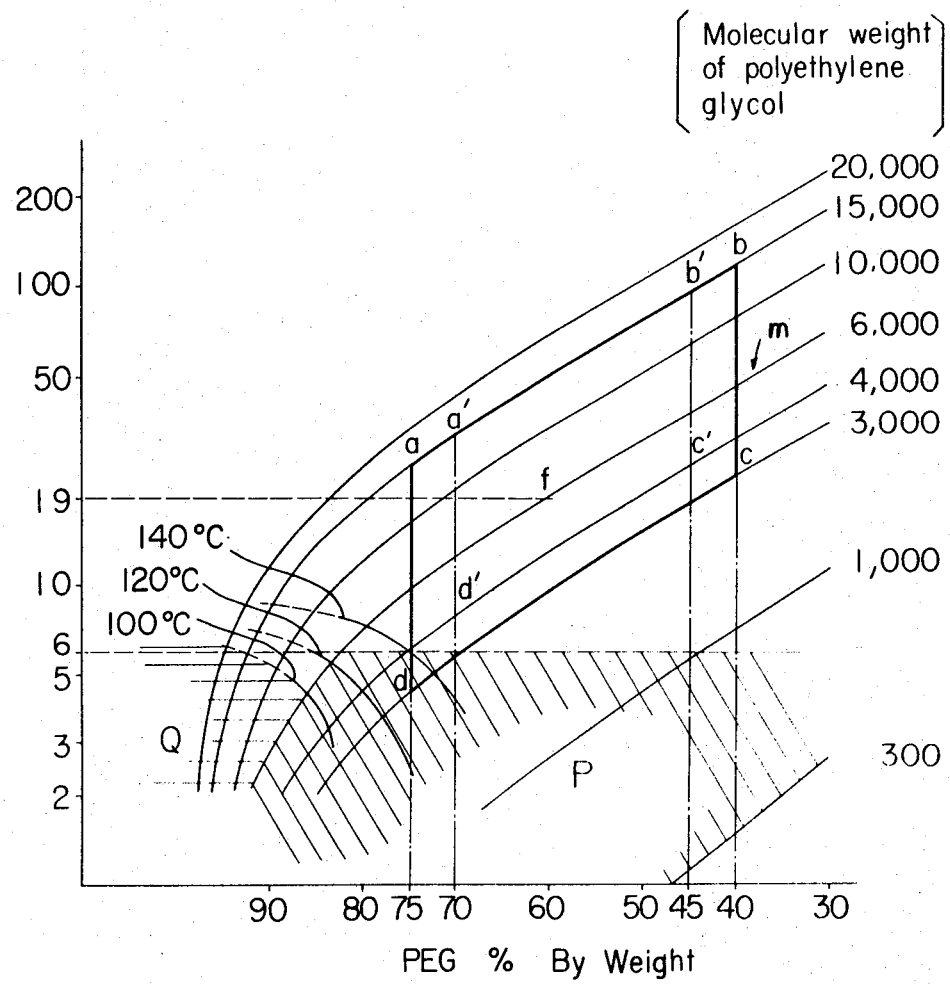

PROCESS FOR IMPROVING SURFACE CHARACTERISTICS OF POLYESTER SHAPED ARTICLES

This application is a continuation-in-part of copending application Ser. No. 587,313 filed Oct. 7, 1966, now abandoned.

The present invention relates to a process for improving surface characteristics of polyester shaped articles such as yarns, fibers, filaments, fabrics, blended fabrics, films, sheets, tubes and rods made of, for instance, polyethylene terephthalate or crystalline copolymeric polyethylene terephthalate so as to impart hydrophilic properties and to provide shaped articles, the durability of which is remarkably improved; more specifically the present invention relates to a process for firmly and persistently imparting durable, desirable surface characteristics such as antistatic properties, soil resistant properties, water-absorbing properties, hygroscopic properties, moisture permeating properties and dyeability to such polyester shaped articles.

More particularly, the present invention relates to a process for improving surface characteristics of polyester-shaped articles which comprises adhering to the surface of polyester-shaped articles a copolyester consisting of A. a water-soluble polyoxyalkylene glycol having a molecular weight of about 7,000–15,000, normally polyoxyethylene glycol;

B. terephthalic acid (however, terephthalic acid as referred to in this invention includes functional derivatives of terephthalic acid like a dialkyl ester of terephthalic acid such as, for instance, dimethyl terephthalate and dibutyl terephthalate, and diaryl ester of terephthalic acid such as, for instance, diphenyl terephthalate); and C. ethylene glycol, the molar ratio of (C) to (B) being at least 2:1. or a copolyester consisting essentially of said A, B and C, normally containing below 15 mol percent based on the total of B and C of the constituents of a third component copolymerizable with B and/or C to be hereinafter described as a constituent of the copolyester and i. A is within the range of 40–75 percent by weight, preferably 45–70 percent by weight, especially preferably 50–70 percent by weight of said polyester and ii. the reduced viscosity of said copolyester is within the range of 0.9–2.0, preferably 1.0–1.5.

Heretofore, it has been known to use a copolyester wholly or mainly consisting of polyoxyalkylene glycol, terephthalic acid and ethylene glycol in order to improve the surface characteristics of polyester-shaped articles, especially to overcome the inevitable high hydrophobic properties stemming from the nature of this polymer and to impart hydrophilic properties thereto.

As such proposal, French Pat. No. 1,401,581 and French Pat. No. 1,286,215 are known.

In these proposals, it is clarified that various limitations are placed on ratio of the copolyester constituents, polymerization method, molecular weight and reaction molar ratio in order to obtain a water-soluble or water-swellable copolyester.

In the former proposal, it is described that the molecular weight of polyoxyalkylene glycol in the copolyester should be 300–6,000, preferably 1,000–4,000 and the relative viscosity (in o-chlorophenol at 25° C.) of said copolyester should be 1.1–1.5 (corresponding to about 0.1–0.5 in reduced specific viscosity). Such copolyester wherein the molar ratio of ethylene terephthalate units to polyoxyethylene terephthalate units is between 2:1 and 6:1 is especially recommended. Further, the former teaches, for instances, that after such copolyester is applied to the surface of a fiber, the fiber and said copolyester are cocrystallized by thermal treatment to ensure adherence to the fiber.

On the other hand, in the proposal of the latter, it is taught that a copolyester should be that which is obtained be reacting a water-soluble polyoxyalkylene glycol having a molecular weight of at least 6,000 terephthalic acid or its ester and ethylene glycol, and a copolyester which is a reaction product of 2–20 mols of terephthalic acid or its ester based on 1 mol of said polyoxyalkylene glycol and at least 2 mols of said ethylene glycol based on 1 mol of said terephthalic acid or its ester. Thus, the copolyester of such proposal has a melting point up to 70° C. The corresponding Japanese Pat. application publication No. 11298/1963 specifies that said copolyester should be water-swellable or water-soluble and should have a softening point below 100° C.

When the copolyester of such proposal is used in coating the surface of polyester-shaped articles, it is possible to impart hydrophilic property to the surface of said articles. However, such desirable property which is imparted is not satisfactory in durability, and does not hold up under normally applied external force such as mechanical friction and bending and the use of such a coating in the presence of water, as in washing is unsatisfactory in that the improved property of the shaped articles whose surface has been treated is easily lost and not recovered even when the articles are freed from such influence. Accordingly, it has long been the desire of those in the art to develop a coating which has continuously excellent durability and maintains the improved surface characteristics.

As a result of investigation to overcome the above shortcomings, it has been discovered that a copolyester whose ratio of constituents and the scope of the molecular weight of polyoxyalkylene glycol are apparently different from those of what has hitherto been proposed and has a melting point above 120° C. can be produced and such copolyester whose reduced specific viscosity is within the range of 0.9–2.0 eliminates the above-noted shortcomings.

Further, the adhering strength of such copolyester to the surface of the shaped articles is very strong and it adheres thereto sufficiently strongly without requiring any baking process. Even with a small amount, the surface has concurrently, high hydrophilic properties, as well as antistatic, soil resistant and wetting ability. Moreover, once such properties are imparted to the articles, they are maintained with excellent durability, the improved properties not being lost by mechanical external force or use in the presence of water, such as washing.

This is a surprising result from the viewpoint of technical common sense that a copolyester for the purpose of imparting hydrophilic properties per se should have hydrophilic properties. As will be shown hereinafter by the specific examples and controls, in spite of the fact that an attempt to impart excellent hydrophilic properties is anticipated to be accompanied by bad result in fastness to washing, the copolyester within the aforementioned specified range used in this invention maintains the durable improved result of the surface characteristics not obtained by the copolyesters within the hitherto recommended ranges.

In addition, it has been discovered that the copolyesters within the specified range concurrently meeting the various requirements having not hitherto been proposed are capable of being produced on an industrial scale. Such copolyesters can be easily produced by adopting a high temperature exceeding the hitherto adopted range as the reaction temperature condition upon producing polyesters. Adoption of such a high temperature is naturally expected to result in disadvantage of coloring. In spite of that, it has been discovered that at such a high temperature the copolyesters within the hither to nonproposed specified range are provided without bringing about substantial disadvantages with respect to coloring.

Accordingly, it is a principle object of the present invention to provide a process for improving the surface characteristics for imparting persistently hydrophilic properties whose durability is remarkably improved to polyester-shaped articles by overcoming the technical shortcomings of the heretofore proposals of the prior art.

It is a further object of the present invention to provide such a process for imparting improved surface characteristics to polyester-shaped articles, particularly, polyester textile products through a process which comprises coating such polyester-shaped articles with an aqueous dispersion of at least one copolyester having specifically defined characteristics.

It is yet a further object of the present invention to provide such a process for providing improved surface characteristics to polyester-shaped articles, particularly, polyester textile articles by coating said polyester articles with an aqueous dispersion of at least one copolyester having a reduced specific viscosity within the range of 0.9–2.0, and obtained by polymerizing a mixture consisting essentially of a water-soluble polyoxyalkylene glycol having a molecular weight of at least 7,000; terephthalic acid; and ethylene glycol.

Yet a further object of the present invention comprises such process wherein the polyester-shaped article, i.e., polyester textile product, picks up said copolyester in an amount within the range of $1\times10^{-7}$ to $1\times10^{-5}$ g./cm.$^2$ based on the surface area of the polyester-shaped article, the article being subsequently dried to obtain a product having improved surface characteristics.

Still further objects and advantages of the novel process of the present invention will become more apparent from the following more detailed description thereof.

Prior to further explaining the process of the present invention, reference is made to the FIGURE.

The attached FIGURE illustrates the relationship of the weight percent of polyoxyethylene glycol of the constituents (abscissa) and the molar ratio of ethylene terephthalate units to polyoxyethylene terephthalate units in the polyester (ordinate) with reference to a copolyester having the following recurring unit

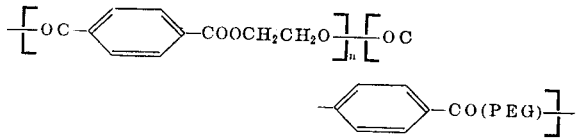

Note: PEG stands for polyethylene glycol)
produced by using polyoxyethylene glycol, dimethyl terephthalate and ethylene glycol as a representative copolyester in the cases wherein polyoxyethylene glycol has a molecular weight of 300–20,000. In the FIGURE, the distribution curves of the melting points of said copolyesters (a temperature where double refraction disappears at a micromelting point tester is made a melting point of the copolyester) are shown.

The copolyesters concurrently meeting the various requirements proposed in French Pat. No. 1,401,581 of which mention has been made belong to obliquely lined zone P while the copolyesters concurrently meeting the various requirements proposed in French Pat. No. 1,286,215 belong to an area defined by line 19 of the ordinate, point $f$ and curve $m$ of molecular weight of 6,000, in view of the condition of the melting point being below 100° C., i.e., obliquely lined zone Q on the left side of the distribution curve of melting point 100° C.

In contrast, what meets the various requirements of the present invention varies somewhat with the ratio of constituents of the copolyesters, addition of a third component and copolymerization conditions; however, such polyester is one whose melting point is above 120° C., normally 170°–200° C., and is within the area defined by points abcd, preferably within the area defined by a'b'c'd'. In the drawing, the zone P and the vicinity of point $d$ of said abcd appear to overlap; however, when the drawing is observed as a three-dimensional zone taking into account reduced specific viscosity, it will be understood that the two are clearly separated zones in the scope of reduced specific viscosity. With respect to zone Q, the melting points of the copolyesters meeting the requirements of the present invention are at least 120° C., normally 170°–220° C. in which respect the zone abcd is different from that of Q.

The shaped articles, i.e., polyester fibers and films treated in accordance with the process of the present invention, can be made to have durable hydrophilic properties by adhering an amount of highly polymerized copolymeric polyester of below $1.0\times10^{-5}$ g./cm.$^2$ without requiring a baking step.

The highly polymerized copolymeric polyester used in this invention can be prepared from a polyoxyalkylene glycol which is component A, terephthalic acid (or its functional derivatives) which is component B and ethylene glycol which is component C; however, a part of component C and/or a part of component B can be replaced by a third component well known in the art of polyester production.

Such a third component can be used in an amount of below 15 mol percent based on the total of components B and C of the copolyester; however, both or at least either one of components B and C must be copolymerizable with such a third component.

A difunctional carboxylic acid and its functional derivatives are representative of those materials which can replace a part of component B. Also a small amount of polyfunctional (at least trifunctional) carboxylic acid may be used. As examples of a difunctional carboxylic acid, there are, for instance, a dicarboxylic acid such as isophthalic acid, diphenyl dicarboxylic acid, diphenylmethane dicarboxylic acid, 2,2-diphenyl propane dicarboxylic acid, diphenyletherdicarboxylic acid, diphenoxyethane dicarboxylic acid, naphthalene dicarboxylic acid, adipic acid, sebacic acid, hexahydroterephthalic acid, and the functional derivatives such as dialkyl esters and diaryl esters of these acids. As tri- or more polyfunctional carboxylic acids which can be used in an amount below 1 mol percent, normally 0.1–1 mol percent based on component B, there may be cited, for instance, trimetallitic acid, pyromellitic acid, mellitic acid, 5-hydroxyisophthalic acid hemimellitic acid and trimesic acid.

As a glycol which can replace a part of component C, there may be cited, for instance, an alkylene glycol having three–10 carbon atoms, and a straight chain or side chain, diethylene glycol, triethylene glycol, an alicyclic glycol; a dihydroxy compound containing an aromatic dihydroxy compound such as hydroquinine, 4,4-dixoydiphenyl, 2,2'-bis(4-hydroxyphenyl)-propane; and an oxy acid such as $\beta$-hydroxyethoxy benzoic acid.

As a polyfunctional hydroxy compound which can be used in an amount below 1 mol percent, normally 0.1–1 mol percent based on these components C, there may be cited, for instance, pentaerythritol, dipentaerythritol, glycerol, trimethylol propane, 1,3,5-trimethylol benzene, 1,3,5-tripropylol benzene and 1,2,6-hexane triol. In this case, a monofunctional carboxylic acid, for instance, o-benzyol benzoic acid, naphthalic acid and benzenesulfonyl benzoic acid may be used simultaneously.

Polyoxyalkylene glycols, component A of the copolyesters used in this invention have a main chain of the general formula

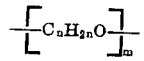

(wherein $n$ is positive integer of 2–4 and $m$ is a positive integer determined by the molecular weight of the polymer).

As examples of such component A, then may be cited polyethylene glycol, polypropylene glycol, N-lauryl-dipolyethylene glycol, N-acetylpolyethylene glycol and their block copolymers. The average molecular weight of these polyoxyalkylene glycols is 7,000–15,000. It is necessary that these polyoxyalkylene glycols are water-soluble. In the copolymeric polyester the weight composition occupied by polyoxyalkylene glycol is necessarily within the range of 40–75 percent by weight based on the entire components, a range of 45–70 percent by weight, especially 50–70 percent by weight being preferable.

When the molecular weight of the water-soluble polyoxyalkylene glycol at said weight ratio is less than about 7,000, said highly polymerized copolymeric polyester cannot show the expected durable hydrophilic effect, and when said molecular weight exceeds 15,000, control of the polymerization step of said highly polymerized copolymeric polyester is difficult and a polyester having uniform quality cannot be obtained.

Further, it is necessary that the copolyester used in this invention has a reduced specific viscosity within the range of 0.9-2.0, a range of 1.0-1.5 being preferable. Regardless of the constituency of the copolymeric polyester, the durable hydrophilic effect which is the object of the present invention can be achieved only through the use of a highly polymerized copolymeric polyester whose reduced specific viscosity is more than 0.9. A highly polymerized copolymeric polyester having a reduced specific viscosity exceeding the upper limit is difficultly soluble in common solvents and is industrially disadvantageous in applying to shaped articles. With a copolymeric polyester whose degree of polymerization is low, the durable hydrophilic effect cannot be obtained at all.

Even if the requirement (ii) of the limitation with respect to reduced viscosity is not added, the copolyester used in this invention shows a high melting point of above 120° C., normally 170°-220° C., and can impart a hydrophilic property to the surface of polyester-shaped articles, which hydrophilic property is not lost by mechanical external force or contact with water, such as washing.

As the practical advantages of using the highly polymerized copolyesters within the range of the combined various requirements, there are:

1. Sufficiently excellent hydrophilic effects can be obtained with the adhered amount of polyester of substantially below 1 percent by weight. Because of this, the present invention is not only very economical, but in the case of fabrics, for instance, the feel will not be adversely affected.

2. Because no substantial heat treatment is required after applying the highly polymerized copolymeric polyester to the surface of polyester-shaped articles. A sufficient effect is obtained by a simple drying, which simplifies industrial utilization. For instance, in the case of fabrics, the application is practicable in the same step as other fiber finishing steps. Thus, an industrially advantageous process can be provided.

To produce the copolyester used in this invention it is possible to carry out the reaction by adding components A, B and C together to the reaction system with heating to carry out a polycondensation reaction while removing the volatile component produced, e.g., methanol, in accordance with the conventional process. As a catalyst, zinc acetate, calcium acetate, manganese acetate, tetramethyl titanate, antimony oxide and lead oxide, all known materials, are utilizable.

In order to obtain the copolyester meeting the combined various requirements of this invention with good reproducibility, at a temperature as high as possible, normally a temperature exceeding 250° C., preferably 260°-300° C., which has hitherto been avoided because it was expected to result in disadvantage of coloring in the producing field of polyesters, a water-soluble polyoxyalkylene glycol, the component A is first reacted with terephthalic acid, the component B in the presence of a catalyst under refluxing conditions, followed by reacting the reaction product with ethylene glycol at 180°-220° C., or a temperature usually adopted. By this procedure the objective copolyester can be provided with industrial advantage. Such copolyester either does not contain a free polyoxyalkylene glycol or contains the same in a negligible amount.

It is possible to add to the reaction system prior to a polycondensation reaction (after the ester-interchange reaction), a known stabilizer, for instance, phosphoric acid, phosphorous acid or esters thereof.

As shaped articles of polyesters imparted with an excellent improved effect of the surface characteristics, those produced from polyethylene terephthalate or a crystalline copolymeric polyethylene terephthalate may be cited.

A crystalline copolymeric polyethylene terephthalate means, for instance, a crystalline copolymeric polyethylene terephthalate obtained by copolymerizing at least one dicarboxylic acid such as isophthalic acid, diphenyldicarboxylic acid, diphenylmethanedicarboxylic acid, 2,2′-diphenylpropanedicarboxylic acid, diphenyletherdicarboxylic acid, diphenoxydiethanedicarboxylic acid, naphthalenedicarboxylic acid, adipic acid, sebacic acid, hexahydroterephthalic acid; an alkylene glycol having two-10 carbon atoms and straight chain or side chain, alicyclic glycol; a dihyroxy compound containing an aromatic dihydroxy compound such as hydroquinone and 4,4′-dioxyphenyl, 2,2′-bis(4-hydroxyphenyl) propane; or an oxy acid such as $\beta$-hydroxybenzoic acid.

In these polyesters, polyesters containing separately or at the same time a compound having one ester-forming group such as, for instance, benzoic acid, benzoyl benzoic acid, monofunctional polyethylene oxide or their functional derivatives and a compound having at least three ester-forming groups such as, for instance, pentaerythritol, trimesic acid or their functional derivatives, may be included.

Said copolymeric polyester can conveniently be applied to the surface of the polyester-shaped articles as a solution in an organic solvent or as an aqueous dispersion so that said copolymeric polyester is adhered to the surface said polyester-shaped articles as a thin layer with the amount of said copolymeric polyester being as low as 0.02-2.0 percent by weight of said articles (about $1\times10^{17}-1\times10^{15}$ g./cm.$^2$ based on the surface area). This is one of the great advantages of the present invention.

As a treating method for adhering, padding, coating and spraying are generally available but any other processes will do as long as they are capable of uniformly adhering the treating agent to the surface.

After the treatment, the organic solvent and/or water is evaporated by proper means such as heat and blowing, making only the copolymeric polyester remain on the shaped articles. By such evaporation and drying steps only, a sufficiently durable adherence is achieved. This may well be called a further substantial advantage of the present invention.

It goes without saying that one may carry out a heat treatment at a temperature higher than the ordinary drying temperature.

As the organic solvent utilizable for dissolving the copolymeric polyester used in this invention, alicyclic ethers, acid amides, lower carboxylic acid phenols, pyrrolidones, chlorinated hydrocarbons, higher alcohols, ethers, ketones, esters and nitro compounds are noted. As specific examples thereof, for instance, there are dioxane, tetrahydrofuran, tetrahydrofurfuryl alcohol, dimethylformamide, dimethyl acetamide, dimethylsulfoxide, acetic acid, formic acid, pyridine, phenol, m-cresol, xylenol, chlorophenol, phenylphenol, N-methylpyrrolidone, methylene chloride, chloroform, dichloroethane, tirchloroethane, tetrachloroethane, chlorobenzene, dichlorobenzenes, chlorotoluences, chloronaphthalenes, butanol, cyclohexanol, benzyl alcohol, anisole, phenetol, diphenylether, dichlorodiethylether, methylisobutylketone, cyclohexanone, acetophenone, methyl benzoate, butyrolactone, nitromethane, notroethane, nitropropances, nitrobenzene, benzonitrile and their mixtures.

Addition of a metal salt is often advantageous for improving solubility of said copolymeric polyester in said organic solvent. As a metal salt usable, there may be cited, for instance, lithium, sodium, calcium strontium, barium, zinc, magnesium, beryllium and cadmium salts of, for instance, hydrochloric, nitric, sulfuric, thiocyanic and acetic acids.

The aqueous dispersion of said copolymeric polyester is most conveniently obtained by emulsifying a solution of the copolymeric polyester in the organic solvent using at least one surface active agent of the anionic or nonionic type. Suitable surfactants will be cited later in detail in each method of emulsification.

Some of the aforementioned organic solvents may act as swelling agent for polyester-shaped articles and increase the durable hydrophilic effect due to said highly polymerized copolymeric polyester by improving adherence to the surface of shaped articles.

Further, in the organic solvent solution or the aqueous dispersion used for adhering the copolymeric polyester to the polyester-shaped articles in accordance with the present invention of which explanation has been made, an antioxidant may be blended. In this case known antioxidants are utilizable; however, 2-mercaptobenzothiazole or its zinc salt, 2-mercaptobenzoimidazole or its zinc salt or a reaction product of diphenylamine and acetone not only increase the hydorphilic property of the obtained treated shaped articles, but also increase their durability remarkably and the treated shaped articles show excellent durability to mechanical force and contact with water, such as washing. Accordingly, the use of these materials serves for effectively maintaining the preferable improved effect of the present invention.

When the industrial application is taken into account, it is advantageous to use the copolyester as an aqueous dispersion.

Such an aqueous dispersion may be prepared by (1) emulsifying said copolyester in the presence of a water-immiscible organic solvent capable of dissolving the copolyester, water and a surface active agent, and after emulsification removing the solvent, if desired, to form an aqueous dispersion, or (2) dissolving the copolyester in the presence of a water-miscible organic solvent and a surface active agent and mixing this solution with water to make an aqueous dispersion. As a third method (3) it is preferable to use an aqueous dispersion obtained by adding water to a solution containing a water-miscible organic solvent capable of dissolving the copolyester, a higher fatty acid and the copolyester. In this case an aqueous dispersion is made under conditions of soap formation by dissolving an alkali substance capable of forming an alkali salt with said fatty acid in said solvent solution or said water.

In the method of (1), an aqueous dispersion is prepared, for instance, as follows. A copolymeric polyester is dissolved in a water-immiscible organic solvent capable of dissolving said polyester to make a uniform solution, which solution is added under stirring to an aqueous solution of at least one anionic or nonionic surface active agent (emulsifier) to emulsify the same; thereafter, when the solvent is distilled off in the presence of a surface active agent having a strong solid dispersing powder (dispersant) under atmospheric or a reduced pressure, an aqueous dispersion containing little if any solvent is obtained. The aforementioned mode of emulsification is a most preferably method; however, the present invention is not to be limited thereby since, for example, it is possible to utilize a method of adding a surface active agent (emulsifier) to a copolymeric polyester solution in advance or to carry out a phase conversion method wherein water is added in small increments to a copolymeric solution containing or not containing a surface active agent to form an O/W dispersion first and, thereafter, re-converting the dispersion to an aqueous dispersion.

In such case, as a solvent any solvent immiscible with water under emulsification conditions for the copolymeric polyester is usable; however, from a practical standpoint those having a dissolving capacity capable of forming at least 1 percent by weight, preferably at least 5 percent by weight of a uniform solution at a temperature below 150° C. are preferred. For instance, there may be cited chlorinated hydrocarbons such as methylene chloride, chloroform, dichloroethane, trichloroethane, tetrachloroethane and chloronaphthalene; higher alcohols such as butanol, cyclohexanol, benzyl alcohol, cresol, xylenol, chlorophenol and phenylphenol; ethers such as anisole, phenetol, diphenylether and dichlorordiethylether; ketones such as methylisobutylkeone, cyclohexanone and acetophenone; esters such as methyl benzoate and butyrolactone; a nitro compound such as nitromethane nitroethanes, nitropropanes, and nitrobenzene; and benzonitrile and mixtures thereof. Above all, chlorinated hydrocarbons such as dichloroethane and tetrachloroethane singly or conjointly have a high dissolving power at a relatively low temperature and are especially useful for the object of the present invention.

As an emulsifier, anionic or nonionic substances such as indicated below are suitable. These include, for example, soap made from a natural or synthetic fatty acids, an alkyl sulfate, an alkylbenzene sulfonate, etherified or esterified polyoxyethylene sulfate, a dialkyl ester of sulfosuccinic acid, or a fatty acid ester of polyoxyethylene sorbitan. These substances can be used singly or conjointly. Of these, an alkyl sulfate having six–18 carbon atoms, polyoxyethylene (3–10 mols) sulfate etherified with a higher alcohol having 10–18 carbon atoms and a alkyl ester, especially dioctyl ester of sulfosuccinic acid are especially useful. The amount of an emulsifier to be used is less than 200 percent by weight based on the dispersed phase, i.e., the copolymeric polyester solution. In case emulsification is possible by other methods without the presence of an emulsifier, for example by ultrasonic wave, an emulsifier becomes unnecessary.

The emulsification is carried out under atmospheric or superatmospheric pressure at a temperature within the range of from room temperature to 200° C.; however, for practical purposes, an operation under atmospheric pressure at a temperature of from room temperature to 100° C. is most often adopted. For stirring, an ordinary stirrer is usable; however, as occasion demands mixers having higher dispersing power such as homomixers, dissolvers and colloid mills may be used.

A nonsolvent aqueous dispersion having the solvent substantially completely removed has the capacity to re-emulsify a new copolymeric polyester solution. By repeating re-emulsification and removal of the solvent it is also possible to prepare an aqueous of higher resin concentration with a smaller amount of emulsifier.

As a dispersant, a surface active agent having a strong capacity to disperse solid particles, for instance, a dialkyl ester (especially dioctyl ester) of sulfosuccinic acid, a condensate of naphthalenesulfonic acid with formaldehyde and sulfoethylamide of a fatty acid having 12–18 carbon atoms, especially sulfoethylamide of oleic acid may be cited. There is no limitation on the amount of these agents, but 1–100 percent by weight based on the copolymeric polyester used is usually suitable. This surface active agent (dispersant) is added before the early emulsification or after the emulsification.

In the method of (2), above, a water miscible organic solvent capable of dissolving the copolyester is used. As such organic solvent, there are aliphatic ethers, acid amides and lower carboxylic acids, phenols such as, for instance, dioxane, tetrahydrofuran, tetrahydrofurfurylalcohol, dimethyl formamide, dimethylacetomide, dimethylsulfoxide, acetic acid, formic acid, pyridine, phenol and N-methylpyrrolidone. These organic solvents may be used singly or as a mixture of at least two thereof.

This method directly dispersed a copolymeric polyester in water with the help of an organic solvent and a surface active agent. The concept, however, is entirely different from that of the conventional method of emulsifying an organic solvent solution in water.

Normally, it is possible to dissolve the copolymeric polyester and a surface active agent in the water miscible organic solvent, and mix the solution with water to prepare a stable aqueous dispersion. When the surface active agent is not sufficiently soluble in the organic solvent, another additive (an adjuster) may conjointly be used to enhance the solubility of the surface active agent in the organic solvent.

As a surface active agent used, those of nonionic type whose HLB values are within the range of 4–18, such as a fatty acid ester, an alkyl ether and an alkylarylether of polyethylene oxide and a fatty acid ester of polyoxyethylene sorbitan, and those of anionic type such as a higher alkyl sulfate, an etherified or esterified polyoxyethylene sulfate and a dialkyl ester of sulfosuccinic acid such as dioctylsulfosuccinate may be cited. As an adjusting agent used when the surface active agent is not sufficiently dissolved in the organic solvent, lower alcohols having less than eight carbon atoms, saturated or unsaturated higher fatty acids having 12–18 carbon atoms and aromatic alcohols such as phenol and benzyl alcohol may be cited.

When obtaining an aqueous dispersion of the copolymeric polyester in accordance with the aforementioned method, carrying out of the process under heated conditions brings about stability. Because solubility of the copolymeric polyester in an organic solvent increases when the former is heated, there is an advantage that an aqueous dispersion solution having a higher concentration by that proportion is obtainable. The organic solvent contained in the obtained aqueous dispersion solution may be removed by a proper process as occasion demands.

The method of (3) is a most preferably method wherein it is possible to use a water miscible organic solvent capable of dissolving a copolyester in a monomer similar to the method of (2), above.

A solution wherein the copolyester, a water miscible organic solvent capable of dissolving the copolyester and a higher fatty acid may be prepared in any adding sequence.

By this method the copolymeric polyester and a higher fatty acid are dissolved in the water miscible organic solvent, thereby dispersing said copolymeric polyester in water rand at the same time, forming an alkali salt of the higher fatty acid, or by the so-called nascent soap method forming a stable aqueous dispersion.

More specifically, this method uses (1) a higher fatty acid (in an amount of 5–100 percent by weight based on the weight of said copolymeric polyester) and (2) an alkaline substance in an amount of at least the equivalent of said higher fatty acid, (1) being used after being dissolved in said organic solvent solution; however, (2) may be dissolved together with (1) in said organic solvent and may also be used after being dissolved in water. In order to obtain an aqueous dispersion, the organic solvent solution system may be added to a water system or vice versa.

As a higher fatty acid suitable for aqueous dispersion of a copolymeric polyester according to this method of (3), there are those having eight–18 carbon atoms, such as, for instance, lauric acid, myristic acid, palmitic acid, oleic acid and linolic acid. As an alkaline substance, there may be cited a hydroxide of an alkali metal such as sodium hydroxide, potassium hydroxide and lithium hydroxide; ethanol amines such as triethanolamine, diethanol amine and monoethanol amine; amino alcohols such as 2-amino-1-butanol, 2-amino-2-methyl-1,3propanediol, 2-amino-2-ethyl-1,3 propanediol and 2-amino-2-methyl-3-hexanol, amines such as morpholine, methylamine, dimethylamine, trimethylamine, monoehtylamine, diethylamine, triethylamine, propylamine, butylamine, cyclohexylamine, diethylcyclohexylamine and tetraethylenepentamine; and ammonia.

When obtaining an aqueous dispersion, carrying out of the reaction at a heated state is convenient for obtaining a stable good object. This is because in a heated state solubility of said copolymeric polyester in an organic solvent rises. There is also an advantage that an aqueous dispersion having a higher concentration is also obtained.

Again the organic solvent contained in the aqueous dispersion may be removed by a proper method if desired.

In each case of emulsification, the aqueous dispersion may contain other additives, such as protective colloids, swelling agents for polyester-shaped articles and stabilizers for copolyester, to improve emulsion stability as well as to enhance efficiency of the finish.

As a protective colloid, for instance, water-soluble polymers such as cellulose derivatives, polyvinylalcohols, polyacrylic acid and their copolymers are cited, and as a swelling agent, for instance, benzyl alcohol, phenol, chlorophenol, tetrachloroethane and dichloroethane may be cited.

As the hydrophilic property imparted to the surface of polyester-shaped articles as referred to in accordance with this invention, specifically increases in antistatic properties, soil resistant properties, hygroscopic properties, water-absorbing properties and moisture permeating properties as well as improvement of dyeability are obtained.

The process of this invention will now be described by reference to the following examples.

For information, the reduced specific viscosity as referred to in this invention is obtained from the value of viscosity measured at 35° C. after dissolving 1.2 g. of said copolymeric polyester in orthochlorophenol at 100° C.

In the examples, parts means parts by weight and percent means percent by weight.

The electric charge generated is a value obtained under the following conditions.

| Apparatus: | Rotary static tester (A product of Koa Co.) |
|---|---|
| Rubbing fabric: | Cotton (40/2) broad |
| Rubbing speed: | 650 r.p.m. |
| Humidity: | 65±1% RH |
| Temperature: | 20±1° C. |

The soiling test was carried out as follows:

Samples of treated and untreated polyethylene terephthalate fabrics are washed at 40° C. for 95 minutes in a solution containing 0.2 percent of vacuum cleaner dust with the laundaometer. The reflectance of the test samples are then measured with a photo electrospectorphotometer (a product of Hitachi Co.), and the degree of soiling (D.S.) is calculated from the formula $$D.S. = \frac{R_o - R_s}{R_o} \times 100$$

where $R_o$ is the reflectance of original material and $R_s$ is that of soiled material.

The wicking property, the ease with which a fabric is wetted by water, is expressed by the time (second) required for one droplet (0.025 ml.) of distilled water to completely permeate or disperse into the fabric structure.

EXAMPLE 1

Five hundred parts of dimethyl terephthalate, 350 parts of ethylene glycol, 850 parts of polyoxyethylene glycol having a molecular weight of 7,500, 1.2 parts of calcium acetate monohydrate and 0.5 part of antimony oxide were charged in an autoclave, while tenderly passing nitrogen thereinto. The autoclave was gradually heated and the temperature was raised to 220° C. in about 2 hours while distilling off methanol produced as a results of an ester interchange reaction. When distilling off methanol was completed, the liquid temperature was raised to 240° C. and while gradually reducing the pressure the temperature was raised to 260° C. and the pressure was reduced to below 1 mm. Hg. in 1.5 hours. Under this condition, polymerization was further carried out for 1.5 hours. The melting point of the so obtained copolymeric polyester was 175±5° C. and the reduced specific viscosity thereof was 1.12. The content of polyoxyethylene glycol was about 63 percent by weight. Next, a 0.75 percent by weight dioxane solution of the obtained copolyester was prepared, with which a 100 percent poly(ethylene terephthalate) plain weave tropical fabric was padded to give a 65 percent wet pick up and dried at 105° C. for 30 minutes.

The so treated fabric showed excellent antistatic, soil resistant and water-absorbing (wicking) property. At the same time, these properties were not adversely affected by repeated washing and the fabric was very fast. The results were shown a follows:

Electric charge generated (Unit: volt)

| Wash-dry cycles | Nontreated fabric | Treated fabric |
|---|---|---|
| 0 | −3800 | −220 |
| 1 | −3900 | −300 |
| 5 | −3850 | −310 |
| 10 | −4050 | −330 |
| 30 | −4000 | −380 |

Soil resistant test

|  | Reflectance (%) | D.S. (%) |
| --- | --- | --- |
| Nontreated fabric | 83.6 | |
| Nontreated soiled fabric | 51.4 | 38.5 |
| Treated soiled fabric | 66.2 | 20.8 |

Wicking property (Unit: second)

| Wash-dry cycles | 1 | 5 | 10 | 30 |
| --- | --- | --- | --- | --- |
| Nontreated fabric | >180 | >180 | >180 | >180 |
| Treated fabric | 1.0 | 1.0 | 1.3 | 1.5 |

Also, the fabric was sufficiently durable to dry cleaning by perchloroethylene. When the dried fabric was further baked at 180° C. for 30 seconds, a result similar to that above was obtained.

Control 1

An ester interchange reaction was carried out at a reaction components composition same as that in example 1. After distilling off of methanol was completed the liquid temperature was raised to 230° C., while gradually reducing the pressure the temperature was raised to 260° C. and the pressure was reduced to below 1 mm. Hg. in 1.5 hour. Under this condition, polymerization was continued further for 45 minutes. The melting point of the so obtained copolymeric polyester was 170°–180° C. and the reduced specific viscosity thereof was 0.7. The polyester adhered to a 100 percent poly(ethylene terephthalate) plain weave tropical fabric could not endure washing. The fabric easily lost the objective hydrophilic effect and a durable hydrophilic property could not be obtained. The test results were as follows.

| Wash-dry cycles | Nontreated fabric | Treated fabric |
| --- | --- | --- |
| 0 | −3800 | −250 |
| 1 | −3900 | −650 |
| 5 | −3850 | −1750 |
| 10 | −4050 | −3630 |
| 30 | −4000 | −3950 |

Control 2

Five hundred parts of dimethyl terephthalate, 350 parts of ethylene glycol, 600 parts of polyoxyethylene glycol having a molecular weight of 1,500 and 0.8 part of titanium tetra ethoxide were charged in an autoclave. While passing tenderly nitrogen thereinto the contents were gradually heated to raise the temperature to 200° C. Thereafter, the temperature was raised to 230° C., with gradual reduction of the pressure to raise the temperature to 265° C., and reduce the pressure to below 1 mm. Hg. in 1.5 hours. Under this condition, polymerization was further continued for 30 minutes. The so obtained copolymeric polyester has a melting point of 140°–150° C. and a reduced specific viscosity of 0.3. The polyester contained about 54.5 percent by weight of a polyoxyethylene glycol component.

Five parts of the copolymeric polyester were dissolved in 45 parts of dioxane to which mixture 0.3 parts of oleic acid were added and the temperature maintained at above 90° C. Separately, a solution was prepared wherein 0.19 parts of triethanolamine were dissolved in 50 parts water. The solution was added with stirring to a heated dioxane solution of the copolyester to which were added 50 parts of water to obtain a stable aqueous dispersion having a resin concentration of 3.3 percent.

The dispersion was diluted 6 times with water to yield a dispersion with which a plain weave taffeta fabric was mangled to a 35 percent wet pickup and then dried at 100° C. for 3 hours. The treated fabric lacked fastness to washing, easily losing a hydrophilic effect and a durable hydrophilic effect.

EXAMPLE 2

In this example comparative data of functional effects of an aqueous dispersion of a (high viscosity type) copolymeric polyester described in example 1 and an aqueous dispersion of a (low viscosity type) copolymeric polyester described in control 2, especially comparative data concerning net solid pickup necessary for achieving the durable surface hydrophilic property and the effect of baking are shown.

In an aqueous dispersion (A) prepared according to the process described in control 2, and an aqueous solution (B) obtained by emulsifying, by the process same as in example 1, each with various resin concentration, a copolymeric polyester prepared in accordance with the process described in example 1, a 100 percent polyethylene terephthalate warp knit fabric was mangled to a 70 percent wet pickup and dried at 105° C. for 30 minutes. Each one part of this dried samples was further heat treated at 150° C. for 30 seconds. The antistatic and wicking properties of the so treated fabrics were as shown in the following table.

| | Heat treatment | Net solid pick up,[1] percent | | | | |
| --- | --- | --- | --- | --- | --- | --- |
| | | Dispersion A | | | Dispersion B | |
| | | 0.5 | 1 | 3 | 0.25 | 0.5 |
| Wash-dry cycles: | | | | | | |
| 1 | None | 1,540 | 800 | 720 | 620 | 480 |
| 5 | | 1,870 | 1,330 | 1,210 | 710 | 600 |
| 10 | | 3,000 | 2,630 | 1,980 | 830 | 790 |
| 30 | | 3,120 | 2,940 | 2,600 | 990 | 1,050 |
| 1 | Yes | 1,820 | 920 | 610 | 615 | 490 |
| 5 | | 2,490 | 1,010 | 740 | 770 | 590 |
| 10 | | 2,800 | 1,230 | 950 | 920 | 780 |
| 30 | | 2,950 | 1,900 | 1,230 | 1,150 | 960 |

[1] Percent by weight of copolyester based on the fabric to be treated.

NOTE.—In case of non-treatment, voltage was 3,000 volts.

| | Heat treatment | Net solid pick up,[1] percent | | | | |
| --- | --- | --- | --- | --- | --- | --- |
| | | Dispersion A | | | Dispersion B | |
| | | 0.5 | 1 | 3 | 0.25 | 0.5 |
| Wash-dry cycles: | | | | | | |
| 1 | None | 32.1 | 22.0 | 13.0 | 4.4 | 4.4 |
| 5 | | 94.7 | 39.9 | 20.5 | 5.6 | 5.2 |
| 10 | | 154 | 81.3 | 42.0 | 13.4 | 12.0 |
| 30 | | 165 | 110 | 63.4 | 20.3 | 17.8 |
| 1 | Yes | 42.7 | 12.8 | 4.9 | 4.8 | 4.9 |
| 5 | | 82.3 | 20.4 | 6.1 | 5.8 | 4.3 |
| 10 | | 158 | 73.2 | 14.5 | 13.0 | 11.5 |
| 30 | | 176 | 138 | 25.6 | 20.6 | 17.0 |

The results of soil resistant test showed a roughly similar inclination to those of said electric and wetting property.

EXAMPLE 3

Five hundred parts of dimethyl terephthalate, 350 parts of ethylene glycol, 1,200 parts of polyoxyethylene glycol having a molecular weight of, 1.4 parts of zinc acetate dihydrate and 0.5 part of antimony oxide were charged in an autoclave, the contents were gradually heated while tenderly passing nitrogen thereinto. The temperature was raised to 255° C. in about 2 hours 50 minutes. Thereafter while reducing the pressure gradually, the temperature was raised to 265° C. and the pressure was reduced to below 1 mm. Hg. Under this condition, polymerization was further continued for 2 hours 30 minutes.

The so obtained copolymeric polymeric polyester contained about 70 percent by weight of a polyoxyethylene glycol component, having a melting point of 200°–210° C. and a reduced specific viscosity of 1.17. Using this copolymeric polyester an aqueous dispersion was prepared as in control 2. Further by distillation dioxane was properly removed and a stable aqueous dispersion having a resin concentration of 5 percent was obtained.

When a polyester fabric was treated as in control 2 using a dispersion of a concentration of 0.75 percent obtained by diluting said aqueous dispersion, a similarly excellent durable hydrophilic effect was obtained.

EXAMPLE 4

Four hundred fifty parts of dimethyl terephthalate, 50 parts of dimethylisophthalate, 350 parts of ethylene glycol, 500 parts of polyoxyethylene glycol having a molecular weight of 7,500, 1.2 parts of calcium acetate monohydrate and 0.5 part of antimony oxide were charged in an autoclave. The contents were gradually heated while passing tenderly nitrogen thereinto, and the temperature was raised to 220° C. in about 2 hours. Thereafter while gradually reducing the pressure, the temperature was raised to 240° C. and the pressure was reduced to below 1 mm. Hg. Under this condition, polymerization was further continued for 1.5 hours. The so obtained copolymeric polyester contained about 50 percent by weight of a polyoxyethylene glycol component, having a melting point of 145°–150° C. and a reduced specific viscosity of 1.40.

Ten parts of this copolymeric polyester were dissolved together in 2 parts of benzyl alcohol and 88 parts of tetrachloroethane, the resultant mixture was mixed, with stirring, with an aqueous solution consisting of 5 mols of polyethylene oxide, 1 part of sodium dioctysulfosuccinate and 97 parts of water. This emulsion was diluted with the same amount of water, and under a reduced pressure at 40°–60° C. the solvent and water were distilled off by azeotropic distillation. Fifty two ml. of tetrachloroethane were recovered as a result; during the period there was hardly any coagulation. A translucent emulsion containing 10.2 percent of a copolymeric polyester was obtained, which could be freely diluted with water. The emulsion was diluted with water to an aqueous dispersion containing 0.5 percent resin with a polyethylene terephthalate plain weave taffeta fabric was treated to give a 55 percent wet pickup and dried at 120° C. for 5 minutes. The so treated fabric exhibited excellent antistatic, soil resistant and wicking properties; moreover, it did not change by repeated washing, the same being a very fast fabric. The results were shown as follows.

[Electric charge generated (unit=volt)]

|  | Wash-dry cycles | | | | |
| --- | --- | --- | --- | --- | --- |
|  | 0 | 1 | 5 | 10 | 30 |
| Non-treated fabric | −2,740 | −2,790 | −2,820 | −2,830 | −2,900 |
| Treated fabric | −43 | −65 | −100 | −150 | −200 |

The results of soiling test were that in contrast to a degree of soiling of a nontreated fabric of 10.8 percent, that of the treated fabric was 2.0 percent. It was recognized that this effect would not be lost by washing.

Control 3

One hundred forty parts of dimethyl terephthalate, 98 parts of ethylene glycol, 1,560 parts of polyethylene glycol having a molecular weight of 13,000, 0.6 parts of zinc acetate dihydrate and 0.2 part of antimony oxide were charged in an autoclave. The contents were heated while passing nitrogen thereinto and the temperature was raised to 230° C. in 2 hours. Thereafter, while gradually reducing the pressure, the temperature was raised to 260° C. and the pressure was reduced to below 1 mm.Hg. and under this condition polymerization was further continued for 1.5 hours. The so obtained copolymeric polyester has a melting point of 60° C. and a reduced specific viscosity of 1.0. Said polyester was almost soluble in water. When polyethylene terephthalate fabrics were treated using a 1 percent solution of said polyester; however, the padded copolyester was almost completely removed by one washing and it was not possible to obtain a durable hydrophilic effect.

EXAMPLE 5

Five hundred parts of dimethyl terephthalate, 350 parts of ethylene glycol, 1,000 parts of a block of polyethylene glycol and polypropylene glycol having a molecular weight of 13,000, 1.4 parts of zinc acetate dihydrate and 0.5 parts of antimony oxide were charged in an autoclave. The contents were heated while tenderly passing nitrogen thereinto. An ester interchange reaction was carried out for 2 hours 20 minutes and the temperature was raised to 240° C. Thereafter while gradually reducing the pressure, the temperature was raised to 260° C. and the pressure was reduced to below 1 mm. Hg. in 1.5 hours. Under this condition, polymerization was further continued for 1.5 hours. The so obtained copolymeric polyester contained about 60 percent by weight of a polyoxyalkylene glycol component, having a melting point of 210° C. and a reduced specific gravity of 1.20.

When the fabric was treated as in example 1 using this copolymeric polyester, a similarly excellent durable hydrophilic effect was obtained.

EXAMPle 6

Thirteen parts of copolyester described in example 1, having a melting point of 170°–180° C., a reduced specific viscosity of 1.12 and containing about 63 percent by weight of a polyoxyethylene glycol component, 0.68 part of oleic acid and 0.43 parts of polyethylene oxide (5 mols) nonylphenyl ether were dissolved on heating in 17 parts of dimethyl formamide and 70 parts of dioxane. Thereafter 0.13 parts of 2-mercapto benzothiazole were added thereto. The entire mixture was added with 200 parts of water containing 0.44 part of triethanolamine and 0.07 parts of polyethylene oxide (15 mols) nonylphenyl ether whereby the entire mixture was emulsified. During this process, the temperature was maintained within the range of 80°–100° C.

After completion of the emulsification, heating was continued, dioxane and water were distilled off, and an aqueous dispersion containing 6.5 percent of a copolymer was obtained. The dispersion was diluted with 10 times amount of water. With this diluted dispersion polyethylene terephthalate warp knit fabric was padded to a 70 percent wet pickup and dried to 120° C. for 5 minutes. This treated knit fabric achieved more excellent durable surface hydrophilic property than the case wherein no 2-mercaptobenzothiazole was added.

Electric charge generated (Unit: volt)

| Wash-dry cycle | Nontreated fabric | Treated fabric 2-mercaptobenzothiazole | |
| --- | --- | --- | --- |
|  |  | None | Yes |
| 1 | 1850 | 490 | 300 |
| 5 | 2550 | 510 | 410 |
| 10 | 2300 | 760 | 580 |
| 30 | 2600 | 910 | 750 |
| 50 | 2850 | 1850 | 910 |

Wicking property (Unit: second)

| Wash-dry cycle | Nontreated fabric | Treated fabric 2-mercaptobenzothiazole | |
| --- | --- | --- | --- |
|  |  | None | Yes |
| 1 | >180 | 5.2 | 4.9 |
| 5 | >180 | 4.3 | 4.9 |
| 10 | >180 | 5.4 | 5.2 |
| 30 | >180 | 9.6 | 5.9 |
| 50 | >180 | 18.0 | 7.8 |

The results of soil test showed a similar inclination. Also, after treating and drying the fabric as mentioned above, when a heat treatment was carried out at 180° C. for 30 seconds, an excellent durability was still confirmed.

When instead of said 2-mercaptobenzothiazole, its zinc salt, 2-mercaptobenzoimidazole or its zinc salt, or a reaction product of diphenylamine and acetone was used, the similar advancement in durability was observed.

EXAMPLE 7

Five hundred parts of dimethyl terephthalate, 1,200 parts of polyoxyethylene glycol having a molecular weight of 7,000, 1.4 parts of zinc acetate dihydrate and 0.5 part of antimony oxide were charged in an autoclave and heated at 280° C. for 2.5 hours. Thereafter 350 parts of ethylene glycol were added thereto and the entire mixture was heated while passing nitrogen thereinto. The temperature was raised to 235° C. in about 2.5 hours. Thereafter, while reducing the pressure gradually, the temperature was raised to 260° C. and the pressure was reduced to below 1 mm. Hg. in 1.5 hours. Under such conditions polymerization was further continued for 2 hours.

The so obtained copolymeric polyester contained about 70 percent by weight of a polyoxyethylene glycol component, having a melting point of 180° C. and a reduced specific viscosity of 1.30.

Ten parts of this copolymeric polyester, 0.1 part of a zinc salt of 2-mercaptobenzoimidazole and 1 part of polyoxyethylene (3 mols) sorbitan monolaurate were dissolved on heating in 90 parts of dioxane, to which mixture were gradually added 200 parts of water with stirring. An aqueous dispersion of a resin concentration of 3.3 percent was obtained. This dispersion was further diluted 5 times with water.

With said diluted dispersion, polyethylene terephthalate warp knit fabric was padded to a 70 percent wet pickup and dried at 120° C. for 5 minutes. The so treated fabric exhibited an excellent antistatic property, wicking property and soil resistant property. These properties were very fast and not adversely affected by repeated washing. Also after similarly treating and drying the fabric, when a further heat treatment was carried out at 180° C. for 30 minutes, the resultant fabric exhibited a similar effect.

EXAMPLE 8

Six hundred eighty parts of dimethyl terephthalate, 1,020 parts of polyoxyethylene glycol having a molecular weight of 8,000, 1.9 parts of zinc carbonate and 0.8 parts of antimony oxide were charged in an autoclave. After the air inside the autoclave was replaced by nitrogen, the contents were heated at 285° C. for 2 hours. Thereafter 475 parts of ethylene glycol were added thereto. While passing nitrogen thereinto the contents were gradually heated and the temperature was raised to 230° C. in about 2 hours 15 minutes. Thereafter while gradually reducing the pressure the temperature was raised to 265° C. and the pressure was reduced to below 1 mm. Hg. in 1.5 hours, under which condition polymerization was further continued for 2 hours. The so obtained copolymeric polyester contained about 60 percent by weight of a polyoxyethylene glycol component, having a melting point of 210° C. and a reduced specific viscosity of 1.09. The polyester was made into an aqueous dispersion according to a process described in example 6 and when a 100 percent poly(ethylene terephthalate) plain weave tropical fabric was treated with the dispersion, the fabric exhibited an excellent antistatic property, soil resistant property and wicking property and these properties were fast and not adversely affected by repeated washing.

EXAMPLE 9 (Controls 4–6)

Preparation of copolyesters.

Five hundred parts of dimethyl terephthalate, 350 parts of ethylene glycol, 850 parts of polyoxyethylene glycol having a molecular weight of 7,500, 6,500 6,000 and 4,500, respectively, 1.2 parts of calcium acetate monohydrate and 0.5 part of antimony oxide were charged in an autoclave. While tenderly passing nitrogen thereinto, the autoclave was gradually heated and the temperature was raised to 220° C. in about 2 hours while distilling off methanol produced as a results of an ester interchange reaction. When distilling off of methanol was completed, the liquid temperature was raised to 240° C. and while gradually reducing the pressure the temperature was raised to 260° C. and the pressure was reduced to below 1 mm. Hg. in 1.5 hours.

The polyoxyethylene glycol contents and the reduced viscosities of the obtained copolyesters were as shown in the following table.

| Copolyester | Molecular weight of polyoxyethylene glycol (POEG) | POEG content percent by weight | Reduced viscosity of copolyester | Melting point of copolyester, °C. |
| --- | --- | --- | --- | --- |
| Example 9 | 7,500 | ca. 63 | 1.20 | 200 |
| Con. 4 | 6,500 | ca. 63 | 1.09 | 190 |
| Con. 5 | 6,000 | ca. 63 | 1.12 | 185 |
| Con. 6 | 4,500 | ca. 63 | 1.18 | 175 |

Preparation of sample fabrics.

Thirteen parts of each copolyester, 0.68 part of oleic acid and 0.43 parts of polyethylene oxide (5 mols) nonylphenyl ether were dissolved on heating in 17 parts of dimethyl formamide and 70 parts of dioxane. Said entire mixture was added with 200 parts of water containing 0.44 part of triethanolamine and 0.07 parts of polyethylene oxide (15 mols) nonylphenyl ether whereby the entire mixture was emulsified. During this process, the temperature was maintained within the range of 80°–100° C.

After completion of the emulsification, heating was continued, dioxane and water were distilled off, and an aqueous dispersion containing 6.5 percent of a copolymer was obtained. Said dispersion was diluted with water. Using this diluted dispersion polyethylene terephthalate warp knit tricot fabric was immersed and then squeezed and dried at 120° C. for 5 minutes.

The concentration of the diluted dispersion used, the squeeze ratio of the immersed fabric and the amount of copolyester picked up by the sample fabric were as shown in the following table.

| Sample fabric number | Number of copolyester used | Concentration of diluted dispersion (percent) | Squeeze ratio (percent) | Amount of copolyester picked up (percent by weight) |
| --- | --- | --- | --- | --- |
| 9–1 | Example 9 | 0.3 | 70 | 0.2 |
| 4–1 | Cont. 4 | 0.3 | 70 | 0.2 |
| 5–1 | Cont. 5 | 0.3 | 70 | 0.2 |
| 6–1 | Cont. 6 | 0.3 | 70 | 0.2 |

The electrostatic property, soiling property and wicking property were measured and calculated as previously. The results were as shown in the following tables. Each result is an average value of 10 runs carried out for 10 sheets made of the same sample fabric. Further, the values of an untreated fabric are shown as controls in each table.

Further, sample fabric 5–2 was prepared in the same way as sample fabric 5–1, except that 5 percent by weight of n-octadecanamide was added to the copolyester in the diluted dispersion.

[Friction electrification voltage: volts]

| Sample fabric number | After 1 time of washing | After 5 times of washing | After 10 times of washing | After 30 times of washing |
| --- | --- | --- | --- | --- |
| 9–1 | −300 | −400 | −650 | −800 |
| 4–1 | −320 | −670 | −1,300 | −2,900 |
| 5–1 | −350 | −1,030 | −2,100 | −3,000 |
| 5–2 | −340 | −1,000 | −2,200 | −3,100 |
| 6–1 | −380 | −1,250 | −2,900 | −3,200 |
| Control | −3,100 | | −3,200 | |

Degree of soiling (percent)

| Sample fabric number | After 1 time of washing | After 5 times of washing | After 10 times of washing | After 30 times of washing |
|---|---|---|---|---|
| 9-1 | 15.0 | 19.0 | 16.9 | 18.2 |
| 4-1 | 16.2 | 18.1 | 20.9 | 25.0 |
| 5-1 | 16.0 | 17.6 | 21.4 | 27.0 |
| 5-2 | 15.7 | 17.5 | 22.0 | 26.8 |
| 6-1 | 15.8 | 16.0 | 25.6 | 27.2 |
| Control | 30.8 | | 32.0 | |

Degree of soiling (%)

| Sample fabric No. | After 1 time of washing | After 5 times of washing | After 10 times of washing | After 30 times of washing |
|---|---|---|---|---|
| 9-1 | 15.0 | 19.0 | 16.9 | 18.2 |
| 4-1 | 16.2 | 18.1 | 20.9 | 25.0 |
| 5-1 | 16.0 | 17.6 | 21.4 | 27.0 |
| 5-2 | 15.7 | 17.5 | 22.0 | 26.8 |
| 6-1 | 15.8 | 16.0 | 25.6 | 27.2 |
| Control | 30.8 | | 32.0 | |

Wicking property (seconds)

| Sample fabric No. | After 1 time of washing | After 5 times of washing | After 10 times of washing | After 30 times of washing |
|---|---|---|---|---|
| 9-1 | 5.0 | 4.7 | 12.5 | 19.0 |
| 4-1 | 7.3 | 18.2 | 36.2 | 96.5 |
| 5-1 | 8.3 | 35.7 | 80.1 | >180 |
| 5-2 | 8.2 | 37.8 | 83.0 | >180 |
| 6-1 | 10.1 | 74.4 | 132.0 | >180 |
| Control | >180 | | >180 | |

Sample taffeta fabrics were prepared in the same way as in the preparation of the sample fabrics above, except that a polyethylene terephthalate taffeta fabric was used in place of said warp knit fabric and the pickup amount was made 0.1 percent by weight, and the same tests were given to the same taffeta fabrics. The results were as shown in the following tables.

[Friction electrification voltage: volts]

| Sample fabric number | After 1 time of washing | After 5 times of washing | After 10 times of washing | After 30 times of washing |
|---|---|---|---|---|
| 9'-1 (taffeta fabric) | −115 | −255 | −430 | −760 |
| 4'-1 (taffeta fabric) | −285 | −460 | −860 | −1,830 |
| 5'-1 (taffeta fabric) | −360 | −670 | −1,350 | −2,870 |
| 5'-2 (taffeta fabric) | −375 | −660 | −1,400 | −2,950 |
| 6'-1 (taffeta fabric) | −420 | −1,000 | −1,980 | −3,100 |
| Control (taffeta fabric) | −2,700 | | −2,850 | |

| | Degree of soiling (percent) | | | | Wicking property (seconds) | | | |
|---|---|---|---|---|---|---|---|---|
| Sample fabric number | After 1 time of washing | After 5 times of washing | After 10 times of washing | After 30 times of washing | After 1 time of washing | After 5 times of washing | After 10 times of washing | After 30 times of washing |
| 9'-1 (taffeta fabric) | 6.9 | 8.6 | 8.5 | 10.9 | 20.2 | 25.4 | 30.3 | 44.6 |
| 4'-1 (taffeta fabric) | 7.3 | 9.8 | 13.1 | 19.8 | 25.1 | 37.8 | 123.0 | >180 |
| 5'-1 (taffeta fabric) | 7.5 | 10.4 | 16.8 | 22.0 | 66.4 | 87.2 | 137.0 | >180 |
| 5'-2 (taffeta fabric) | 7.5 | 11.0 | 17.5 | 21.7 | 68.0 | 148.5 | >180 | >180 |
| 6'-1 (taffeta fabric) | 8.7 | 13.4 | 20.5 | 22.1 | 87.3 | 144.1 | >180 | >180 |
| Control (taffeta fabric) | 20.6 | | 19.8 | | >180 | | >180 | |

From the results of the above experiments, it is found that in the case the copolyester of the present invention wherein the molecular weight of polyoxyethylene glycol is above 7,000 is used, superior improved properties are shown, especially the durability against washing of the properties imparted by the treatment is far superior, as compared with the cases where copolyesters obtained by using polyoxyethylene glycol having a molecular weight below 7,000 are used, or a fatty acid amide is used jointly with such copolyesters.

What is claimed is:

1. A process for imparting improved surface characteristics, including improved antistatic properties, soil-resistant properties, water-absorbing properties, hydroscopic properties, moisture permeating properties and dyeability, to polyester textile products which comprises:
   1. coating said polyester textile products with an aqueous dispersion of at least one copolyester having an reduced specific viscosity within the range of 0.9–2.0 and a melting point of at least 120° C. and obtained by polymerizing a mixture consisting essentially of:
      A. a water soluble polyoxyalkylene glycol having a molecular weight of 7000–15,000;
      B. terephthalic acid; and
      C. ethylene glycol;
      the molar ratio of (C) to (B) being at least 2:1 with (A) being employed in an amount so as to be present in an amount of 40–75 percent by weight based on the weight of the copolyester, wherein the amount of said copolyester picked up by said textile product being within the range of $1\times10^{17}$ to $1\times10^{15}$ g./cm.$^2$ based on the surface area of said textile products; and
   2. subsequently drying the coated textile product to thereby obtain a product having improved surface characteristics.

2. The process of claim 1 wherein said copolyester is obtained by first reacting said polyoxyalkylene glycol (A) with terephthalic acid (B) at a temperature within the range of 260°–300° C., and thereafter polymerizing the reaction product of (A) and (B) with ethylene glycol (C).

3. The process of claim 1 wherein said aqueous dispersion contains a surface active agent.

4. The process of claim 1 wherein said aqueous dispersion contains an alkali metal slat of a higher fatty acid.

5. The process of claim 1 wherein said aqueous dispersion contains an antioxidant.

6. The process of claim 5 wherein said antioxidant is selected from the group consisting of 2-mercaptobenzothiazole, a zinc salt thereof, 2-mercaptobenzoimidazole, a zinc salt thereof, and the reaction product of diphenyl amine and acetone.

7. The process of claim 1 wherein said copolyester additionally contains a further component in an amount of less than 15 mol percent based on the total amount of (B) and (C), said further component being copolymerizable with (B), (C) and mixtures thereof.

UNITED STATES PATENT OFFICE
CERTIFICATE OF CORRECTION

Patent No. 3,619,276      Dated November 9, 1971

Inventor(s) SHIMEHA ET AL

It is certified that error appears in the above-identified patent and that said Letters Patent are hereby corrected as shown below:

Claim 1, line 3, delete "hydroscopic" and substitute --hygroscopic--.

Claim 1, line 7, delete "an" and substitute --a--.

Claim 1, line 20, delete "$1 \times 10^{17}$ to $1 \times 10^{15}$" and substitute --$1 \times 10^{-7}$ to $1 \times 10^{-5}$--.

Claim 4, line 2, delete "slat" and substitute --salt--.

Signed and sealed this 25th day of April 1972.

(SEAL)
Attest:

EDWARD M. FLETCHER, JR.
Attesting Officer

ROBERT GOTTSCHALK
Commissioner of Patents